United States Patent [19]

Ojima et al.

[11] Patent Number: 4,959,041
[45] Date of Patent: Sep. 25, 1990

[54] TENSIONER FOR A CHAIN, A BELT OR THE LIKE

[75] Inventors: Juji Ojima, Aikawa; Kazuo Ishii; Fumio Numakura, both of Miyata, all of Japan

[73] Assignee: NHK Spring Co., Ltd., Yokohama, Japan

[21] Appl. No.: 413,093

[22] Filed: Sep. 27, 1989

Related U.S. Application Data

[63] Continuation of Ser. No. 268,918, Nov. 9, 1988.

[30] Foreign Application Priority Data

| Nov. 9, 1987 | [JP] | Japan | 62-282648 |
| Aug. 31, 1988 | [JP] | Japan | 63-216794 |
| Aug. 31, 1988 | [JP] | Japan | 63-216796 |
| Aug. 31, 1988 | [JP] | Japan | 63-216797 |
| Aug. 31, 1988 | [JP] | Japan | 63-216798 |

[51] Int. Cl.$^5$ ............................................ F16H 7/08
[52] U.S. Cl. ................................. 474/111; 474/138
[58] Field of Search .................... 474/101, 109–111, 474/113–117, 136, 138

[56] References Cited

U.S. PATENT DOCUMENTS

| 4,300,890 | 11/1981 | Hallmann et al. | 474/138 X |
| 4,702,726 | 10/1987 | Ojima et al. | 474/138 X |
| 4,722,720 | 2/1988 | Ojima et al. | 474/138 X |
| 4,902,266 | 2/1990 | Ojima et al. | 474/111 |

Primary Examiner—Thuy M. Bui
Attorney, Agent, or Firm—Fleit, Jacobson, Cohn, Price, Holman & Stern

[57] ABSTRACT

A tensioner is provided with a female screw member for the tension adjustment of a belt or a chain screwed with a male screw provided a rotation force by a spring and a bearing in which the female screw member is inserted and constrains the rotation of the female screw member.

In this tensioner, an outer form of the female screw member is formed so as to correspond to a bearing hole of the bearing. By this, an approximately whole length of the female screw member is able to slide through the bearing hole, and the stroke length of the female member can be secured sufficiently even if the size of the device in a tension controlling direction is shortened.

6 Claims, 9 Drawing Sheets

TENSIONER FOR A CHAIN, A BELT OR THE LIKE

This is a continuation of application Ser. No. 07/268,918, filed Nov. 9, 1988.

BACKGROUND OF THE INVENTION

This invention relates to a tensioner which provides a fixed tension to a chain or a timing belt which drives a cam shaft of an engine in a car for tensioning it.

Generally, a tensioner is used for an engine as a chain tensioner or a belt tensioner. When the slackness of the chain or the belt occurs by the elongation or the abrasion thereof, the tensioner acts so as to push it in a fixed direction directly or indirectly and to maintain a fixed tension.

FIG. 19 presents a conventional example of such tensioner. As illustrated in FIG. 19, a male screw member 2 and a female scew member 3 are inserted within a casing 1 being threaded each other. The male screw member 2 is screwed with the female screw member 3 at the fore half portion of the male screw member 2, while at the latter half portion of the male screw portion 2 a coil spring 4 is inserted through the outside thereof. One end 4a of the coil spring 4 is inserted into a long groove 1a formed within the casing and another end 4b is inserted into a slit of the male screw member 2, whereby the male screw member 2 is provided with a rotative force. On the other hand, the female screw member 3 penetrates through a bearing 5 secured to an opening end (left end) of the casing 1, the top end thereof (left end) being covered with a cap 6. A hole of the bearing 5 wherein the female screw member 3 penetrates therethrough, is formed to be a non-circular shape such as a small oval form or the like wherein opposite surfaces are deleted parallel and the outer form of the female screw member 3 is also formed to be a same one. In such a construction, the rotation of the female screw member 3 is restrained by the bearing 5 and the rotative force from the male screw member 2 changes to a pushing force to the female screw member 3, whereby the female screw member 3 advances directly in a drawing out direction from the casing 1 (left direction). Accordingly, the cap 6 at the top end of the female screw member 3 always urges the belt or the chain, whereby a constant tension is adapted to be maintained. In FIG. 19, the numeral 7 is a boot capable of elongation or shrinkage which covers the opening end of the casing 1, and the numeral 8 is a seal bolt scewed with a base end (right side) of the casing 1. These boot 7 and seal bolt 8 are provided in order to prevent the invasion of dusts from inside and outside of the engine into the casing 1 and to prevent the leakage of lubricant oil in casing 1 to the outward.

However, in such construction, it is necessary to be provided with the fore half portion wherein the male screw portion 2 is screwed with the female screw member 3 and the latter half portion wherein the coil spring is inserted through the outside thereof. In this case, a size of the male screw member determines a dimension of the device. As a result, a whole device becomes long in an axial direction. This direction is one which controls the tension of the chain or the belt. Accordingly, in view of installing the engine at a very narrow space, a short size is desirable and a long size is a fatal problem from the point of installation.

In order to intend shortening of such size, such an idea is proposed in which the male screw member, the female screw member, and the coil spring are combined with so as to be piled up in a diameter direction (Utility Model Laid-Open No. 62(1987)-115554. In this device, the female screw member screwed with the male screw member is rotated by the aid of the coil spring, whereby the male screw member is adapted to advance through the screwed portion. Since thus the male screw member is adapted to advance, a portion of the male member where performs a straight advancement being supported by a bearing is formed to be a non-circular sectional area agrees with the bearing, thereby constraining the rotation of the male screw member itself. This male screw member is possible to advance until a screw portion (circular sectional area) formed at the male screw member abuts against the bearing. However, in such a construction, the stroke of the advancing male screw member is stopped by the screw portion having a circular sectional area. Therefore, the stroke of the male screw member can not be secured sufficiently and the length for the tension controlling of the chain or the belt becomes smaller even if the shortening of the whole device is possible. By this, an adjustable range thereof is reduced and the practicability is also decreased.

In the conventional technique, when the is long, the installation thereof to the engine or the like is difficult. On the other hand when the device is shortened, its stroke becomes short, whereby the range of the tension control is reduced.

The object of this invention is to provide a tensioner such as a chain, a belt or the like.

The object of this invention is to provide a chain, a belt or the like which satisfies the miniaturization of the device and the security of a sufficient range of the tension control.

SUMMARY OF THE INVENTION

This invention is provided with a female screw member threaded with a male screw member rotated with a spring and a bearing which constrains the rotation of the female screw member by the insertion of the female screw member, an outer form of said female screw member being formed so as to correspond to the bearing hole. By this, an approximately whole length of the female screw member is possible to slide through the bearing hole, whereby the length of the stroke of the female screw member can be sufficiently secured even if the size of the device in the tension controlling direction is shortened.

DETAILED DESCRIPTION OF THE INVENTION

The embodiment of this invention is hereinafter described with reference to the accompanying drawings.

Figure 1:
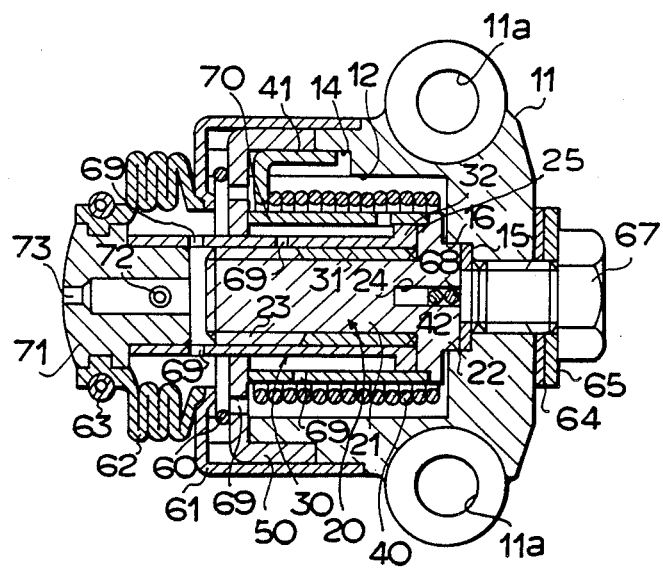
FIG. 1, FIG. 2 and FIG. 3 are a sectional view, a left side view, and a right side view in an embodiment of this invention respectively.
Figure 2:
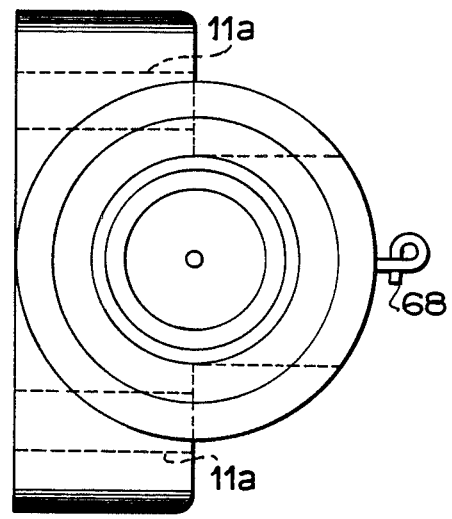
Figure 3:
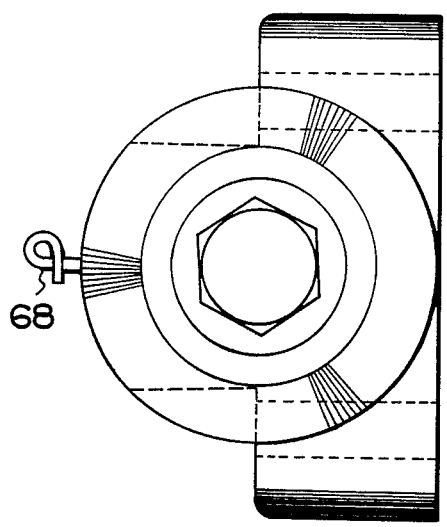
Figure 4B:
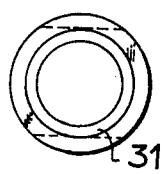
FIG. 4(a), (b) and (c) are a sectional view, a left side view and a right side view of the female screw member respectively.
Figure 4A:
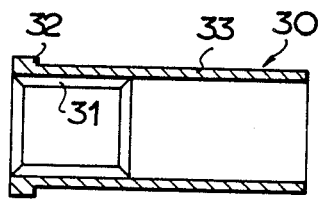
Figure 4C:
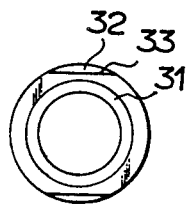
Figure 5:
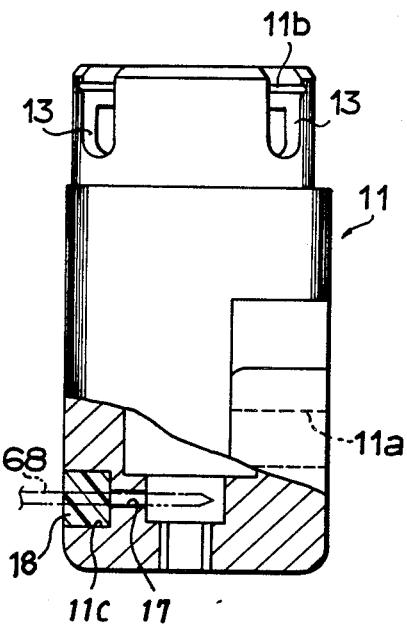
FIG. 5 is a partially broken side view of the casing.
Figure 6A:
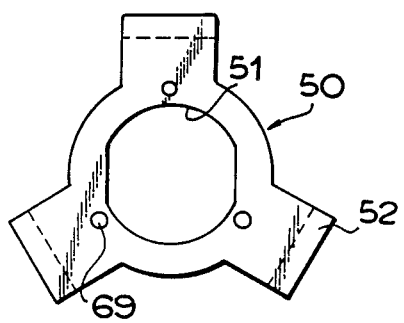
FIG. 6(a) and (b) are a front view and a side view of the bearing member respectively.
Figure 6B:
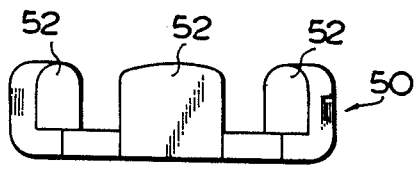

FIG. 1 is a sectional view of an example of this invention applied to a belt tensioner. FIG. 2 and FIG. 3 are respectively a left side view and a right si view thereof. A hollow portion 12 in the axial direction is formed to a casing 11 wherein an attaching hole 11a to an engine or the like is formed at the outside thereof, said hollow portion 12 being incorporated with male screw member 20, female screw member 30 and coil spring 40 therein. An axial portion 21 at the top end side (left end side) of the male screw member 20 is screwed with the female screw member therein, while a fixed portion 22 of a base portion (right side) thereof is inserted into a dent portion 16 formed at the base portion of the hollow portion 12 together with a washer 15, thereby being supported rotatively. In this case, a screw portion 23 is provided through the whole outer circumference of the axial portion 21 of the male screw member 20. On the other hand, in the female screw member 30, a screw portion 31 screwed with the male screw portion 23 is formed at a part of the inner circumference. Further, a bearing member 50 is provided at the top end portion (left end portion) of the casing 11. As illustrated in FIG. 6, the bearing member 50 is formed to be a approximately triangle star shape as a whole and the bearing hole 51 is opened at the central portion thereof. Further, outwardly extending portions from the bearing hole 51 toward three directions are bent at approximately right angles to form engaging pieces 52. This engaging piece 52 is inserted within engaging groove 13 formed at the top end portion of the casing 11, thereby fixing the bearing member 50 to the casing 11. For this purpose, the engaging groove 13 in which the engaging piece 52 is inserted is formed at the top end of the casing 11 as shown in FIG. 5. The engaging piece 52 is not only formed to bend at approximately right angles as described above, but also may be projectingly formed outwards in the same plane as the forming plane of the bearing hole 51. In this case, it is desirable to thicken the thickness of the bearing member 50 in order to decrease the surface pressure against the casing 11. Further, the forming number of the engaging piece 52 are not defined to three as shown in FIG. 6, but can be designed to be arbitrary. If the numbers increase, the torque of the spring 40 can be bindly adjusted. Although, for instance, when the three engaging pieces 52 are provided (FIG. 6), the minimum, adjustment angle thereof becomes 60°. Accordingly, a fine adjustment is possible. Further, a u type groove 13 described above can be, of course, provided in casing 11 according to the number of the engaging piece 52. The bearing hole 51 in this example is bored to be approximately an oval form and consists of a set of parallel lines and two arc lines which connect opposite end portions of the parallel lines respectively. The female screw member 30 is inserted into the bearing hole 51, to slide in a constrained status of the rotation. For this purpose, the outer form of the female screw member 30 is formed to be one which corresponds to the bearing hole 51 by cutting an axial portion 33 to be parallel as shown in FIG. 4. Since approximately a whole body of the female screw member 30 is possible to be inserted into the bearing hole 51, the stroke length of the female screw member 30 can be secured sufficiently.

A stopper flange 32 having a large diameter is formed at the base portion of the female screw member 30. The advancement of the female member 30 is stopped by the abutment of the stopper flange against the bearing member 50, whereby drawing out of the female screw member can be prevented.

The coil portion of the coil spring 40 is inserted through the outward of the female screw member 30, one end thereof 41 being bent in the axial direction of the casing 11 to insert into a long groove 14 formed in the hollow portion 12 of the casing. On the other hand, another end 42 of the coil spring 40 is inserted into a slit 24 formed at the fixed portion 22 of the male screw member 20. By this, the male screw member 20 is allowed to rotate by the coil spring 40, thereby the female screw member 30 is adapted to drive to go straight on. In such a construction wherein the male screw member 20 is inserted into the female screw member 30 and the female member 30 is inserted into the coil spring 40, the miniaturization of the device can be attained by shortening the length in the axial direction of the device, or the length in the tension controlling direction. Further, according to this example, the female screw member 30 is only threaded with the male screw member 20 coaxially. Accordingly, there exists no supporting port at the bottom of the hollow portion 12 in the casing 11, thereby being able to design shorter the length in the axial direction thereof so much.

Furthermore, in this example a cylindrical collar 70 is inserted between the female screw member 30 and the coil portion of the coil spring 40. Although the collar 70 is no always necessary because this has no relation to the substantial performance as a tensioner, the installation of this collar prevents the contact and the invasion of the coil portion to the female screw member 30 due to the bending of the coil portion, whereby the slide of the female screw member 30 becomes more smooth. The base portion of such collar 70 is inserted into a step portion 25 formed at the outer circumference of the fixed portion 22 in the male screw member 22, thereby carrying the supporting thereof.

Further, in this example a cap member 71 is inserted at the top end portion of the female screw member 30, the top end portion of this cap member 71 being adapted to abut against the belt. The numeral 72 is a spring pin forcibly inserted into the female screw member 30 and the cap member 71 in order to prevent the drawing out of the cap member 71. In FIG. 1, the numeral 60 is a snap ring engaged with the top end surface of the casing 11, which prevents the slipping out of the bearing member 50. The numeral 61 is a cover which coats the top end of the casing 11 and the numeral 62 is a boot wherein the base portion thereof is adhered to the cover 61, the top end portion of the casing 11 being coated by these. The numeral 63 is a garter spring which prevents the slipping out of the boot 62. Further, a seal bolt 67 is screwed with a base side of the casing 11 by way of a seal plate 64 and a washer 65, whereby the base side is adapted to be sealed. Furthermore the numeral 68 is a stopper pin inserted into the casing 11 from outside so as to be able to insert or draw out, the top end thereof being adapted to attain within the slit 24 of the male screw member 20. For this purpose, a dent portion 11c wherein the seal member 18 consists of an elastic member where the stopper pin 68 is insertable therethrough is inserted, is formed and further a penetrated hole 17 of the stopper pin 68 which interconnects the dent portion 16 of the fixed portion 22 of the male screw member 20 is provided. By this, the rotation of the male screw member 20 is locked in a state where the stopper pin 68 is inserted therein. Since this example is used in air as a belt tensioner a lubricant oil is sealed in the interior of the device. In order to perform a smooth flowing of the lubricant, oil holes 69 are formed in female screw member 30, bearing member 50 and collar 70 properly. This oiling hole 69 is not only formed as a penetrated hole, but also a broken portion formed at the end surface of the collar 70 may be used. Further, in this example an air escaping hole 73 which communicates outward is formed at the cap member 71, thereby being able to correspond to internal volume changes of the boot 62 and the casing 11. In this example, the cap member 71 is used as an upper portion so that the lubricant oil may not leak from the air escaping hole 73.

The air escaping hole 73 is not only provided to the cap member 71, but also the penetrated hole 17 of the stopper pin can be used as an air escaping hole. In other words, the penetrated hole 17 can be used as an air escaping hole by romoving the stopper pin and further removing the seal member 18 inserted into the dent portion 11c. In this case, the whole device is used turning it sideways so that the penetrated hole 17 may be upwards in order to prevent the leakage of the lubricant oil from the penetrated hole 17.

The construction of this invention described above engages the collar 70 on the male screw member 20 threaded with the female screw member 30 thereon, inserts this within the coil spring 40, latches another end portion 42 of this coil spring 40 to the slit 24 of the male screw member 20, installs the cap member 71 at the top end of the female screw member 30 and inserts the bearing member 50 at the axial portion of the female screw member 30, thereby forming a subassembly. Then, this subassembly is inserted within the casing 11 and further a fixed portion 22 of the male screw member 20 is inserted into the casing 11 together with washer 15 so as to be releasably supported, said subassembly being prevented from going out of place by the aid of a snap ring 60. The snap ring 60 is engaged with a groove 11b formed at the top end of the casing 11. After securing the cover 61 having a fixed one end of the boot 62 to the top end of the casing 11 due to caulking or adhesion, another end of the boot 62 is secured to the cap member 71 with garter spring 63, thereby sealing the top end portion of the casing 11. After that, a tool such as driver or the like is inserted into the slit 24 of the male screw member 20 from the base side of the casing 11, whereby the male screw member 20 is allowed to rotate to wind up the coil spring 40 so that the energy may be stored therein. In this state, the stopper pin 68 is inserted to perform a rotation locking. Further, after the lubricant oil is injected into the casing 11, the sealing is carried out by the seal bolt 67. By this, the construction of the device is completed. When this device is fixed to the engine or the like and the stopper pin 68 is drawn out, the male screw member 20 rotates by the aid of the coil spring 40, whereby the female screw member 30 goes ahead to urge the belt.

FIG. 7 shows various kinds of modification of the outer form in the female screw member 30. In the example of FIG. 7 (a), though the axial portion 33 of the female screw member 30 is circular form, a part thereof is broken like a straight line. In FIG. 7(b) broken areas are formed at 4 places at equivalent intervals and the outer form of the axial portion 33 is formed to be approximately a regular square having arc line at each four corner area.

Figure 7A:
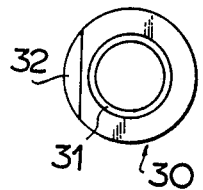
FIG. 7(a)–(d) are side views in various modifications of the female screw member.
Figure 7B:
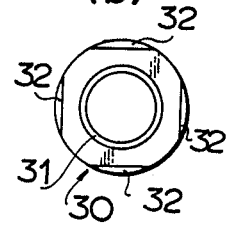
Figure 7C:
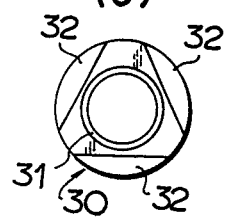
Figure 7D:
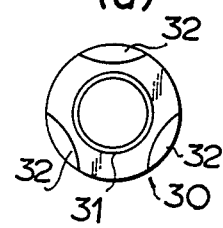

In FIG. 7(c), broken areas are formed at 3 places and the outer form of the axial portion 33 is formed to be approximately a triangle. In FIG. 7(d), the broken area of the arc line is formed at 3 places. Even in these modifications, the outer form of the axial portion 33 inserted into the bearing hole of the bearing member is a non-circular form. The axial portion 33 of the female screw member 30 may be formed to be square outer form.

Accordingly, the rotation of the female screw member 30 is constrained by forming the bearing hole of the bearing member so as to correspond to the form of this member, thereby being able to perform the straight advancement.

Since the above example is applied to the belt tensioner, the lubricant oil is sealed in the interior of the casing. However, when this is applied to an engine of an autobicycle as a chain tensioner, there is no need of the above lubricant oil because it is secured in the engine oil in a soaking state. In this case, since there is no need of boot, the length of the female screw member 30 can be more shortened. By this, the length of the device in the controlling direction can be shortened.

Figure 8A:
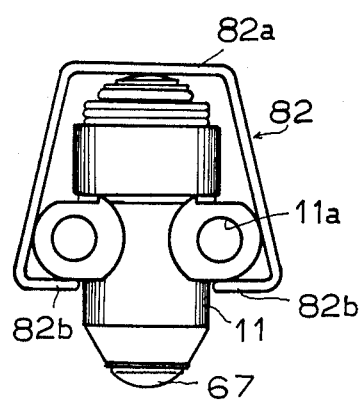
FIG. 8(a) and (b) are respectively a side view and an enlarged sectional view of another example of this invention.

FIG. 8(a) and (b) represent other embodiments of this invention.

In this embodiment, the same elements as in the embodiments described above are shown by the same numbers and explanations thereof deleted.

This embodiment is different from the embodiment described above in the points that the fixed portion 22 of the male screw member 20 is changed to washer 15 to support it by a cylindrical supporting member 80 having a bottom without being provided with collar 70, the cap member 71 is closely constructed without being provided with air escaping hole 73, the construction between cover 61 and casing 11 is sealingly constructed using a seal ring 81, a stopper member 82 is used in place of stopper pin 68, and the spacer 83 intervene between the bearing member 50 and the casing 11. However, this embodiment is the same as the embodiment described above in the terms of that the construction thereof is a triple one wherein the male screw member is inserted into the female screw member 30 and the female screw member is inserted into the coil spring 40.

Figure 9:
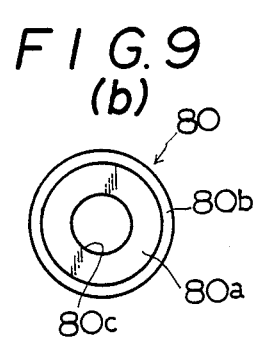
FIG. 9(a) and (b) are respectively a sectional view and an elevation view of a supporting member of the above another example.
Figure 9:
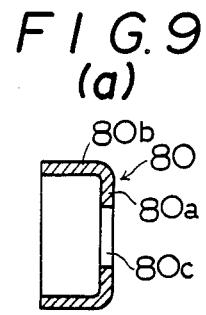

The supporting member 80 is, as shown in FIG. 9(a) and (b), formed to be a cylindrical shape having a bottom using a stiff material through the whole body thereof. In other words, the cylindrical portion 80b is disposed in upright from the bottom portion 80a. An outer diameter of the cylindrical portion 80b is formed to a size insertable into a dent portion 16 formed at the base portion of the cavity portion 12 of the casing and the inner diameter of the cylindrical portion 80b is formed to a size in which the fixed portion 22 of the male screw member 20 is inserted rotatively. Further, an escaping hole 80c used for assembling of the tensioner and winding of the spring 40, is provided at the central portion of the bottom 80a. Such supporting member 80 is inserted into the dent portion 16 of the casing and the fixed portion 22 of the male screw member 20 is inserted into the cylindrical portion 80b. In such a construction, the supporting member 80 lies between the dent portion 16 of the casing 11 and the fixed portion 22 of the male screw member 20 to prevent a direct contact of the male screw member to the casing 11 thereby being able to prevent the wear of the casing 11 caused by the rotation of the male screw member 20. By this, since the casing 11 can be formed by a light material such as aluminium, its alloy or a synthetic resin, it is possible to decrease the weight of the casing. Further, since the cylindrical portion 80b of the supporting member 80 extends to cover the outer surface of the fixed portion 22 of the male screw member 20 and the supporting force increases, the more stable support of the rotation can be performed. Furthermore, since the supporting member 80 is an independent part, the mechanical working thereof is easy as compared with the working of the casing 11 itself and the precision working also becomes easy because of its simple construction. Accordingly, this has a merit which is possible to perform easily the working suitable to a stable rotation of the male screw member 20.

Figure 18:
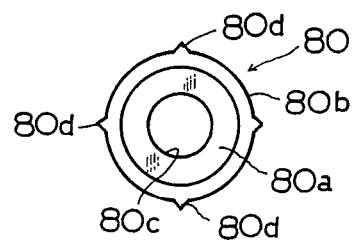
FIG. 18 shows a modification of the supporting member, wherein (a) is a central sectional view, (b) is a plan view and (c) is a side view thereof.
Figure 18:
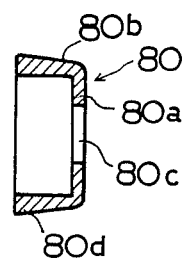
Figure 18:
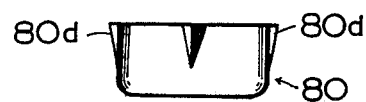
Figure 19:
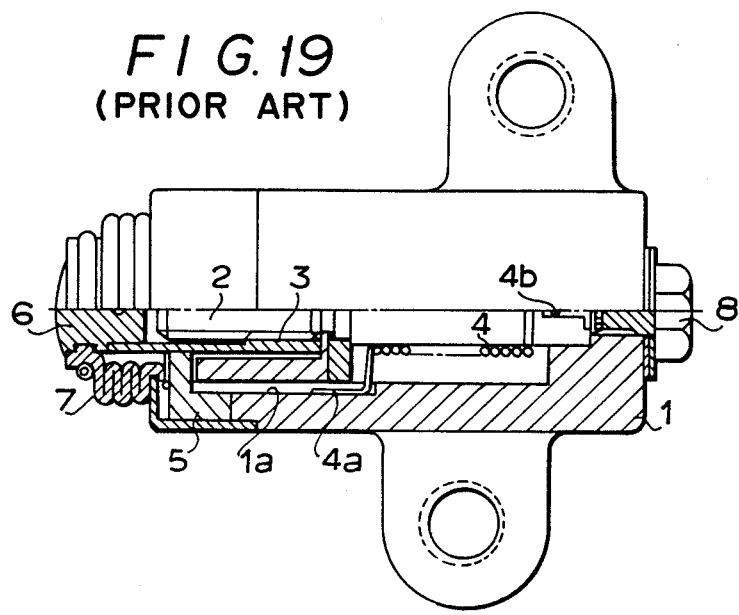
FIG. 19 is a partly broken side in the conventional device.

This supporting member 80 may be, as shown in FIG. 18(a), (b), (c), provided with projections 80d at the outer circumpherence of the cylindrical portion 80b. The projection 80d is is formed so as to be elongated in a longitudinal direction and tapered downward from an upper end brim of the cylindrical portion 80b to downward (in a bottom 80a direction) along the outer side of the cylindrical portion 80b. By this, when the supporting member 80 is forcibly inserted into the dent portion 16 of the casing, the projection 80d cuts into the inner circumferential wall of the dent portion 16, whereby the rotation of the supporting member 80 is securely obstructed. Since the above projection 80d is thus formed in order to obstruct the rotation of the supporting member 80, at least only one formation of the project may be sufficient.

Figure 8B:
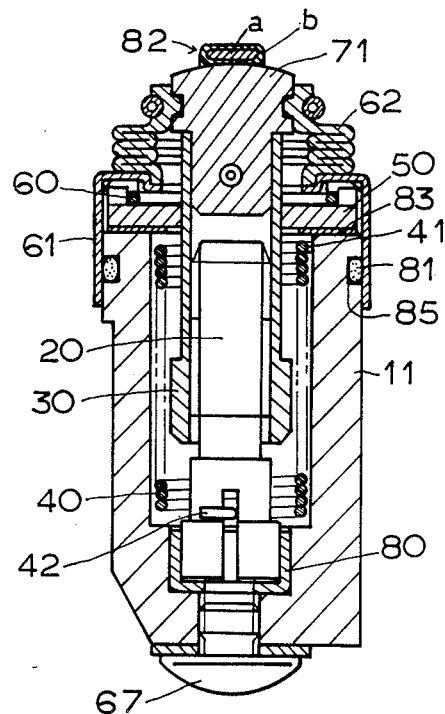

The cover 61 of this embodiment is attached sealingly to the casing 11 with a seal ring 81 attached in a circumferential groove 85 provided at the outer surface of the casing 11 as shown in FIG. 8(b). The seal ring 81 of an elastic body and when the cover 61 is attached to the casing 11 in a state where the seal ring is inserted in the circumferential groove 85 the seal ring 81 adheres to the inner surface of the cover 61 and the outer surface of the casing 11, thereby sealing therebetween. By this, the invasion of dusts from outside and the leakage of the lubricant oil sealed in the interior of the casing 11 are prevented. In a construction wherein such seal ring 81 is used, the air tight engagement between the cover 61 and the casing 11 can be securely carried out. Accordingly, there is no need of a high accuracy of the size for the prevention of the air leakage at the attached portion of the cover 61. This causes the easiness of the working and the improvement of the productivity.

The stopper member 82 of this embodiment is, as shown in FIG. 8(a) and (b), formed by bending a spring plate member a coated with a synthetic resin b around the all outer circumstance in symmetry with respect to the left and the right, abutting a pressing portion 82a against the top portion of the cap member 71, and latching two portions 82b, 82b formed oppositely at the opening ends to a forming position of the attaching hole 11a, the casing 11. The above synthetic resin a slide preventive performance which prevents the slipping off of the pressing portion 82a of the stopper member 82 from the top portion of the cap member 71. This is due to the fact although the top and of the cap member 71 which contacts with an urged member (not shown) is formed an arc-like or a sphere for maintaining a good contact with it if ever the contact point thereof slips off with a stroke of the female member 30, when the flat surface of the stopper member 82 abut the top end of the cap member 71 having such surface, it is apt to be drawn out by slip and a good stopper performance can not be obtained.

Figure 10:
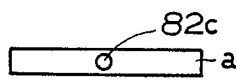
FIG. 10 to 12 are a stopper member of the above another example wherein (a) is a sectional view, (b) is a plan or a side view respectively.
Figure 11:
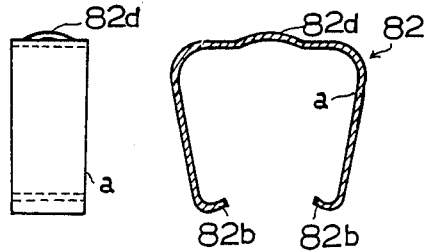
Figure 11:
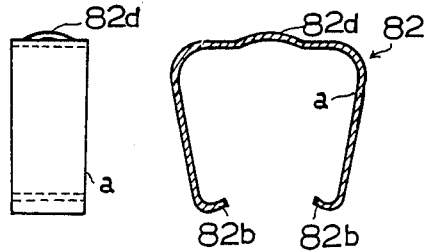
Figure 10:
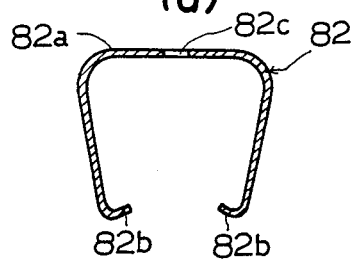
Figure 12:
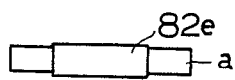
Figure 12:
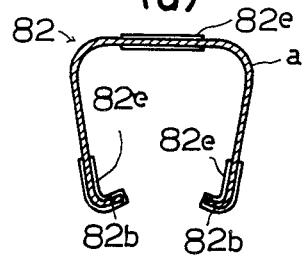

FIG. 10 to FIG. 12 represent modifications of the slide preventive means of the stopper member 82.

The stopper member 82 shown in FIG. 10 and FIG. 11 consist of spring plate a and a hole 82a and an arc-like dent 82d projects to outward are respectively provided at the approximately central portion of the pressing portion 82a. Into this hole 82a and the dent 82d is inserted a part of the top portion of the cap member 71 and latched with it. By this latching, the slide prevention is performed each other and the stopper member 82 is prevented from coming off. The stopper member 82 in FIG. 12 is partly coated with a synthetic resin 82e having a slide preventive performance at near the abutting position of the cap member 71 of the pressing member 82a and the latching portion 82b.

This stopper 82 can be removed by widening the opening end portion to release the latching state of the latching portions 82b,82b. The stopper member 82 is easily attached to the casing 11 and is able to lock the advancement of the female screw member 30 in a stable state Accordingly, there is no occurrence that the use of the stopper becomes impossible by unprepared advancement of the female screw member at the time of conveyance and storage.

Figure 13:
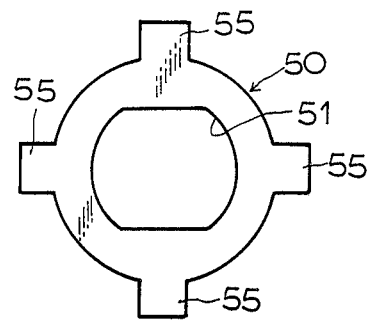
FIG. 13(a) and (b) are respectively a plan view and a side view of a bearing in the above another example.
Figure 13:
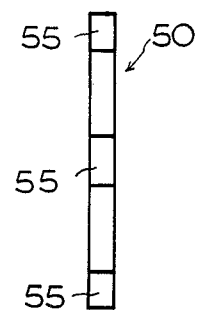
Figure 14:
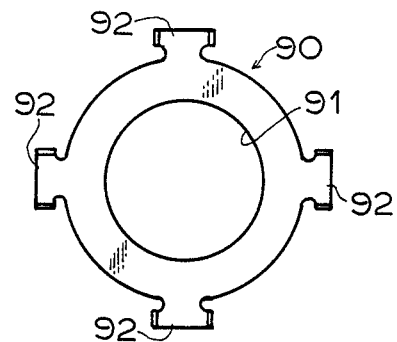
FIG. 14(a) and (b) are a plan view and a side view of a spacer in the above example.
Figure 14:
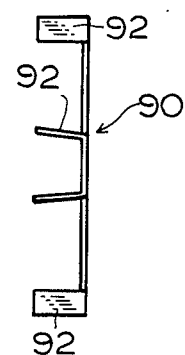

Further, in this embodiment the spacer 90 consists of the stiff material intervenes between the bearing member 50 and the casing 11. The bearing member 50 used at this time is provided the bearing hole 51 at the central area thereof and the engaging pieces 55 project at 90 degree intervals at the outside portions respectively as shown in FIG. 13. The spacer 90 is, as shown in FIG. 14, provided an interconnecting hole 91 which communicates with the bearing hole 51 of the bearing member 50 at the central area thereof, said interconnecting hole 91 being formed approximately a ring shape. At the outside portions of the spacer 90, receiving pieces 92 having type are formed at 90 degree intervals. As shown in attaching states in FIG. 15 and FIG. 16, the spacer 90 is inserted between the top end surface of the casing 11 and the bearing member 50. In this insertion, the receiving piece 92 is adapted to be inserted into the u type groove 13 of the casing 11 first. In this state, the attaching piece 55 of the bearing member 50 to which a rotation force of the male screw member 20 acts is adapted to avoid the direct contact with casing 11 by being wrapped with the receiving piece 92 of the spacer 90. In other words, even if the rotation force of the male screw member transmitted through the female screw member 30 acts on the attaching piece 55 of the bearing member 50, the attaching piece 55 does not contact with casing 11 directly and the urged pressure thereof is received by the receiving piece 92 of the spacer 90. By this, since the rotation force from the attaching piece 55 does not act on the casing 11 directly, the wear at the contact portion of the attaching piece 55 decreases. As a result, there is no need of making the case 11 with a hard material having anti-wearing property. Accordingly, it is possible to endure for use sufficiently even if making it with aluminium or its alloy, synthetic resin, or other light material. Therefore, this has merits in the points that the weight of the casing 11 can be decreased and the selection of the material is also enlarged.

Figure 15:
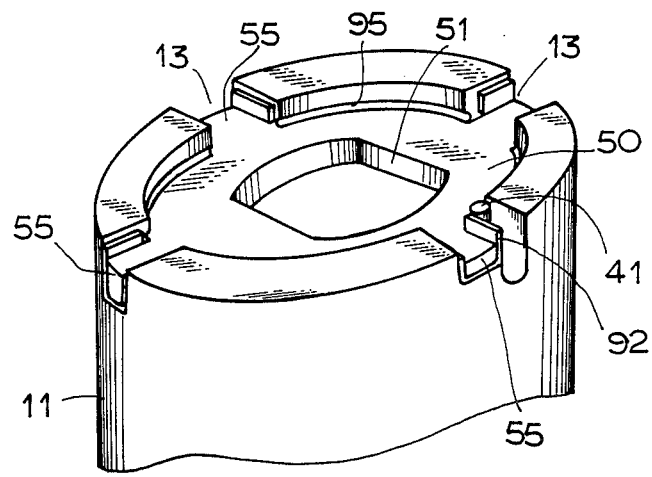
FIG. 15 and FIG. 16 are respectively a perspective view of the material portion and a sectional area of the material portion thereof which explain the attached conditions of the bearing and the spacer in the above another example.
Figure 16:
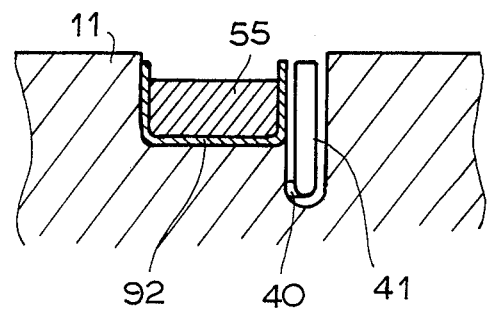

Further, in FIG. 15, the numeral 95 is a groove wherein a snap ring 60 for prevention of coming off of the bearing 50 is inserted therein.

Figure 17:
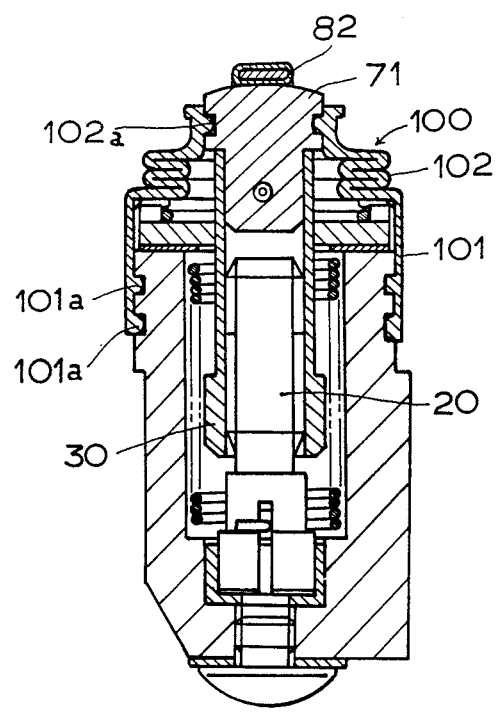
FiG. 17 is a sectional view in a further another example of this invention.

FIG. 17 shows another embodiment of this invention.

This embodiment is a modified example of the cover 61 and the boot 62 in FIG. 8 which use a cover member 100 formed integrally with a same element.

Namely, in FIG. 17, the cover member 100 consists of a cylindrical cover portion 101 and a boot portion 102 continuously connected with the cover portion 101. These are elastic member of rubber and formed intergrally. At the inner surface of the cover portion 101 and the boot portion 102, a ring-like projections 101a, 101a and 102a are formed respectively. The casing 11 is connected with the cap member 71 by the aid of that the projections 101a, 101a and 102a are inserted respectively into the circumference grooves formed at the outer surface of the casing 11 and the cap member 71, and further the connecting portion is secured sealingly by the elastity of the elastic member.

Such cover member 100 is easy in preparing as compared with one connected after the cover and the boot are separately constructed. Further, the sealing of the base side of the casing 11 in the above each example may be used with a sealing cork consists of an elastic member such rubber and the like in place of the seal bolt 67. In this case, the screw portion at the casing side 11 is not provided, but a step portion which latches with a large diameter of ring-like rib provided at the sealing cork may be only provided, whereby the working thereof becomes more easy. In this invention as described above, since the outer form of the female screw member which performs tension control of a belt, chain or the like can be formed to correspond to the form of the bearing hole which constrains the rotation thereof, almost whole length of the female screw member slides through the bearing hole, thereby being able to maintain the stroke length thereof sufficiently. Accordingly, the length of the device in the axial direction can be shortened without sacrifice of the stroke length of the male screw member, whereby the miniaturization of the device can be obtained.

What we claim is:

1. A tensioner for a chain, or a belt comprising:
   a casing,
   a male screw member and a female screw member installed within the casing in a screwed state,
   a spring which provides a rotation force to said male screw member,
   a bearing into which the female screw member is inserted so that the female screw member may advance in an axial direction by rotation of the male screw member while constraining the rotation of said female member, and
   a supporting member which supports the male screw member rotatively between said male screw member and the casing.

2. A tensioner for a chain, a belt or the like according to claim 1 wherein said female screw member has a non-circular outer form.

3. A tensioner for a chain, a belt or the like according to claim 2 and further comprising a slide preventative means which prevents sliding against a top end portion of the female screw member in a stopper provided at an abutment portion thereof.

4. A tensioner for a chain, a belt or the like according to claim 1 wherein said bearing is provided with an engaging piece inserted into said casing to constrain the rotation of said bearing.

5. A tensioner for a chain, a belt or the like according to claim 1 and further comprising a stopper which locks the advancement of the female screw member by abutment with the top end portion of the female screw member, said stopper being removably attached to the casing.

6. A tensioner for a chain, a belt or the like according to claim 1 wherein a portion between the female screw member and the casing is surrounded by a boot and an end portion of the boot is connected to a cap attached to the casing, thereby providing a seal ring between the cap and the casing.

* * * * *